US010089381B2

(12) United States Patent
Fontaine (10) Patent No.: US 10,089,381 B2
(45) Date of Patent: Oct. 2, 2018

(54) METHODS, SYSTEMS, AND COMPUTER PROGRAM PRODUCTS FOR IMPLEMENTING A CLASSIFICATION DATABASE

(71) Applicant: Amadeus S.A.S., Biot (FR)

(72) Inventor: Gael Fontaine, Antibes (FR)

(73) Assignee: AMADEUS S.A.S., Biot (FR)

( * ) Notice: Subject to any disclaimer, the term of this patent is extended or adjusted under 35 U.S.C. 154(b) by 688 days.

(21) Appl. No.: 14/620,624

(22) Filed: Feb. 12, 2015

(65) Prior Publication Data

US 2016/0239563 A1    Aug. 18, 2016

(51) Int. Cl.
*G06F 17/30*    (2006.01)

(52) U.S. Cl.
CPC .. *G06F 17/30598* (2013.01); *G06F 17/30663* (2013.01)

(58) Field of Classification Search
CPC ......... G06F 17/30598; G06F 17/30663; G06F 17/30554
USPC ........................................................ 707/737
See application file for complete search history.

(56) References Cited

U.S. PATENT DOCUMENTS

| | | | | |
|---|---|---|---|---|
| 8,375,020 B1* | 2/2013 | Rogers | ............ | G06F 17/30038 707/708 |
| 9,473,437 B1* | 10/2016 | Jakobsson | ............... | G06F 21/55 |
| 2002/0152101 A1 | 10/2002 | Lawson et al. | | |
| 2003/0023575 A1* | 1/2003 | Shlain | ..................... | G06K 9/68 706/52 |
| 2007/0179863 A1 | 8/2007 | Stoll | | |
| 2008/0034083 A1* | 2/2008 | Koran | ................... | H04L 41/065 709/224 |
| 2009/0030885 A1 | 1/2009 | DePasquale et al. | | |
| 2009/0271232 A1* | 10/2009 | Waguet | ................. | G06Q 10/06 705/7.36 |
| 2010/0223499 A1* | 9/2010 | Panigrahy | .......... | G06F 11/0709 714/19 |
| 2013/0006904 A1* | 1/2013 | Horvitz | ................. | G06Q 10/10 706/46 |
| 2013/0046547 A1* | 2/2013 | Drucker | ................ | G06Q 10/00 705/1.1 |
| 2013/0262222 A1 | 10/2013 | Gibson et al. | | |

(Continued)

FOREIGN PATENT DOCUMENTS

EP    2259217 A1    12/2010

OTHER PUBLICATIONS

International Patent Office, International Search Report and Written Opinion issued in corresponding Application No. PCT/EP2016/000183 dated Apr. 1, 2016.

*Primary Examiner* — Thanh-Ha Dang
(74) *Attorney, Agent, or Firm* — Thompson Hine LLP (57) ABSTRACT

Methods, systems, and computer program products for implementing a classification database. An electronic data storage device may host the classification database and may be in data communication with a classification system. The classification system may be configured to receive data relating to a scheduled event having an undetermined classification. In response to receiving the data, at least one processor of the classification system may be configured to automatically query the classification database for classification rules and apply the classification rules to the scheduled event to resolve a classification for the scheduled event.

13 Claims, 7 Drawing Sheets

(56) References Cited

U.S. PATENT DOCUMENTS

| | | | | |
|---|---|---|---|---|
| 2013/0276107 A1* | 10/2013 | Edwards | ............... | G06F 21/552 726/22 |
| 2013/0304363 A1 | 11/2013 | Dai et al. | | |
| 2014/0304116 A1* | 10/2014 | Chan | ................... | G06F 3/04817 705/26.62 |
| 2014/0372351 A1* | 12/2014 | Sun | ...................... | G06N 99/005 706/12 |
| 2015/0089470 A1* | 3/2015 | Shakespeare | ........... | G06F 8/315 717/108 |

* cited by examiner

FIG. 10

METHODS, SYSTEMS, AND COMPUTER PROGRAM PRODUCTS FOR IMPLEMENTING A CLASSIFICATION DATABASE

TECHNICAL FIELD

The present invention generally relates to computer databases and, more particularly, to systems, methods, and computer program products for implementing a classification database.

BACKGROUND

A computer database enables large amounts of electronic information to be organized in a logical manner. Such logical organization enables the computer database to quickly and efficiently return such information, or at least a portion thereof, in response to a query received from a requesting system. The requesting system may then use the information returned from the database to facilitate a process executed by the system.

Event and ancillary services providers may implement computer systems that utilize attributes of a scheduled event to offer a more tailored experience to the event participant. In this way, the providers are able to take actions of increased relevance and value to the event participant based on such attributes. For example, in the case of a reserved flight to a given destination, a conventional provider system may recommend a hotel that is near the given destination, rather than a distant hotel, to the reserved passenger. When an event or service provider takes actions of increased relevance and value to potential event participants, such participants are more likely to make a reservation with the provider or otherwise take advantage of the services offered.

Unfortunately, typical event and service provider systems often select such tailored actions based merely on explicit attribute information of the scheduled event, such as those manually entered by the event participant. These systems do not implement a computer database to facilitate inferring attributes from the scheduled event, such as the scheduled event's classification, much less take into consideration such inferred attributes when selecting a tailored action. As a result, while the conventional systems may provide a potentially relevant recommendation based upon a destination that is explicitly listed in a scheduled event, those systems cannot select an action or provide a recommendation based upon an inferred classification of the scheduled event, such as the scheduled event's purpose or type. By not including a mechanism or database that facilitates inferring a classification for a scheduled event, the conventional systems lack insight as to the potential actions that may be increasingly relevant and valuable to a particular event participant.

Hence, improved systems, methods, and computer program products are needed for implementing a classification database that facilitates classifying scheduled events.

SUMMARY

In an embodiment, a method for implementing an event classification database is provided. The method may include establishing a connection for data communication between a classification system and at least one electronic data storage device that hosts the event classification database, and receiving data relating to a scheduled event having an undetermined classification at the event classification system. In response to receiving the data, the method may further include automatically causing at least one processor of the classification system to perform the following: query the event classification database for a plurality of classification rules, and apply the classification rules to the data relating to the scheduled event to resolve a classification for the scheduled event.

In another embodiment, a system for implementing an event classification database is provided. The system may include at least one electronic data storage device that hosts the event classification database and a classification system in data communication with the electronic data storage device. The classification system may include at least one processor and a memory storing instructions configured, upon execution by the at least one processor, to cause the classification system to receive data relating to a scheduled event having an undetermined classification. Execution of the instructions may further cause the classification system to automatically perform the following in response to receiving the data: query the event classification database for a plurality of classification rules, and apply the classification rules to the data relating to the scheduled event to resolve a classification for the scheduled event.

In another embodiment, a computer program product for implementing an event classification database is provided. The computer program product may include a non-transitory computer readable medium storing instructions. The instructions may be configured, upon execution by at least one processor of a classification system in communication with an electronic data storage device that hosts the event classification database, to cause the classification system to receive data relating to a scheduled event having an undetermined classification. Execution of the instructions may further cause the classification system to automatically perform the following in response to receiving the data: query the event classification database for a plurality of classification rules, and apply the classification rules to the data relating to the scheduled event to resolve a classification for the scheduled event.

BRIEF DESCRIPTION OF THE DRAWINGS

The accompanying drawings, which are incorporated in and constitute a part of the specification, illustrate various embodiments of the invention and, together with the general description of the invention given above, and the detailed description of the embodiments given below, serve to explain the embodiments of the invention.

DETAILED DESCRIPTION

One or more of the embodiments disclosed herein may be directed to implementation of an event classification database. The event classification database may include a plurality classification rules stored therein. These rules, when applied to a scheduled event having an undetermined classification, may facilitate resolving a classification for the scheduled event. Event providers, such as an airline, hotel, concert promoter, sporting franchise, car service, entertainment group, and the like, may offer and manage the reservations for one or more events (e.g., a flight). A scheduled event may include one or more reservations of such offered events.

The event providers and ancillary service providers (e.g., third-party sellers) may wish to select an action relating to a scheduled event, or relating to an inquiry that may result in the scheduled event, to create a tailored experience for an event participant. For example, a provider may wish to select an action such as transmitting relevant advertisements relating to the scheduled event to the event participant or potential event participant, applying relevant participant preferences to the scheduled event or inquiry that may result in the scheduled event, or executing a relevant process for the scheduled event or inquiry. Such selected actions may benefit the providers by encouraging event participants to reserve the provider's offered events and services.

The implementation of the event classification database facilitates the classifications of scheduled events via an essentially automatic process, which can serve as a basis for selecting actions relating to the scheduled event. Knowledge of a classification of a scheduled event, such as the purpose of the scheduled event (e.g., leisure or business), may further enable the event and service providers to create a tailored customer experience. Armed with such knowledge, the provider may select a particularly relevant action that reflects the classification.

To prevent event participants or other users from having to manually designate a classification for a scheduled event, the event classification database may be used in conjunction with a classification system to automatically determine such classifications. More particularly, the event or service provider may send data relating to the scheduled event to a classification system, which may then query the event classification database for the classification rules. The classification system may apply the classification rules to the scheduled event to resolve a classification for the scheduled event. The classification system may return the resolved classification to the provider, who may then select an action tailored to the resolved classification. In this way, the implementation of the event classification database improves the provider systems by enabling such systems, via an automated process, to provide increasingly customized experiences via tailored actions over that which is provided by conventional systems.

Figure 1:
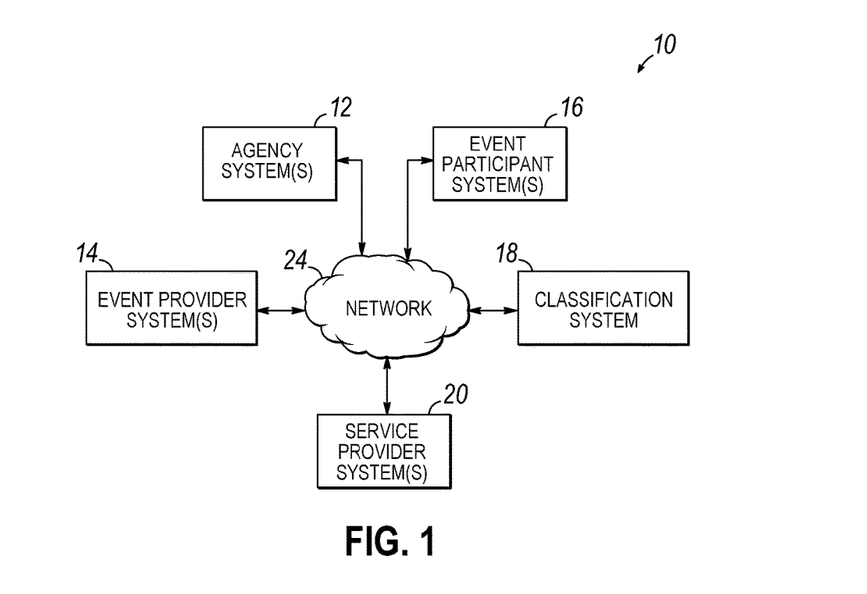
FIG. 1 is a diagrammatic view of an exemplary operating environment including a plurality of computing systems and a network.

Turning now to the Figures, FIG. 1 provides an exemplary operating environment 10 for implementing an event classification database. Operating environment 10 may include one or more agency systems 12, one or more event provider systems 14, one or more event participant systems 16, a classification system 18, and one or more service provider systems 20. Each of these systems may communicate with one another through a network 24, such as the Internet. Furthermore, one or more of these systems may be omitted from operating environment 10 or combined. One or more of these systems may also be configured to communicate with one another via a direct wired or wireless connection.

An event provider system 14 may include any system that enables an event provider to manage event offerings. Event offerings may include, as non-limiting examples, seats on a flight or train, concert tickets, hotel rooms, car rentals, tickets to sporting events, and the like. An agency system 12 and event participant system 16 may connect to an event provider system 14, such as via the network 24, to reserve such event offerings and manage prior reservations. In general, an event participant system 16 may include any end-user system (e.g., a passenger's computer) for reserving an event offering or managing a reservation, and an agency system 12 may include any system of an agent (e.g., a travel agent) that assists end-users in reserving event offerings or managing reservations at an event provider system 14. An event provider system 14 may also provide mechanisms for inventory tracking and yield management.

An event provider system 14 may store one or more reservations of the system's event offerings. One or more of such stored reservations may include a scheduled event. For example, a single reservation may include multiple sub-reservations, such as a flight sub-reservation, a hotel sub-reservation, a car sub-reservation, and the like. A scheduled event may include one or more of these sub-reservations. A scheduled event may also include a portion of a reservation or sub-reservation, such as flight segment that forms a portion of a larger flight reservation. Alternatively, a scheduled event may include an entire single reservation or multiple reservations, such as one or more separate flight reservations, car reservations, and/or hotel reservations, all of which may relate to the same trip. Operating environment 10 may include an event provider system 14 for each event provider. For example, operating environment 10 may include an event provider system 14 for each airline, hotel, concert promoter, sporting team, car rental service, train operator, and the like that is part of the system.

In one exemplary embodiment, an event provider may be an airline, and an event provider system 14 may include a Computer Reservation System ("CRS") that enables an agency system 12 or event participant system 16 to book and pay for airline tickets. Upon an air reservation being made, the CRS may be configured to create a passenger name record ("PNR"), which may include the itinerary and fare details of all passengers under the air reservation, for storage in a PNR database. Like the one or more reservations stored by event provider system 14, one or more PNR's may include a scheduled event.

Each event provider system 14 may interact with other event provider systems 14, the agency systems 12, or the event participant systems 16 either directly or through the one or more service provider systems 20. In this way, an event provider system 14 may list and sell event offerings of another event provider system 14. The event provider system 14 that is responsible for an event offering sold by another event provider system 14 may bill or otherwise receive payment from the event provider system 14 that actually sold the event offering. Such an arrangement may enable any one of the event provider systems 14 to package event offerings from other systems with its own offerings, which may help to bolster sales, and likewise accept and store reservations for event offerings of more than one event provider system 14. Similar to an event provider system 14, a service provider system 20 may also provide reservation systems, inventory tracking, and yield management for multiple event providers 14 linked thereto.

In one exemplary embodiment, service provider system 20 may include a Global Distribution System ("GDS") that facilitates communication between each of the event provider systems 14, between the agency systems 12 and the event provider systems 14, and between the event participant systems 16 and the event provider systems 14. The GDS may maintain links to a plurality of the event provider systems 14 via the network 24. In this way, the GDS may route a reservation request for an event offering issued from an agency system 12, event provider system 14, or event participant system 16 to the event provider system 14 responsible for the requested offering. The GDS may further enable agency systems 12 and event participant systems 16 to make a reservation for event offerings of multiple event provider systems 14 via a single connection to the GDS. For example, the GDS may enable a traveler, via a personal computer or mobile computing device, to make a single reservation that includes a flight, car, and hotel. Each of these reservations may relate to the same trip. The GDS may be configured to store the details of reservations made therethrough in a record. Like the one or more reservations stored by event provider system 14, one or more of the records stored by the GDS may include a scheduled event.

Classification system 18 may be configured to receive data relating to an unclassified scheduled event from any of the agency systems 12, event provider systems 14, event participant systems 16, and service provider systems 20. In general, an unclassified scheduled event may refer to a scheduled event having an undetermined classification. In other words, an unclassified scheduled event may refer to a scheduled event for which no particular purpose (e.g., leisure or business) or event type has been declared or resolved. The data relating to the unclassified scheduled event may include an undetermined classification indicator to this effect.

Figure 2:
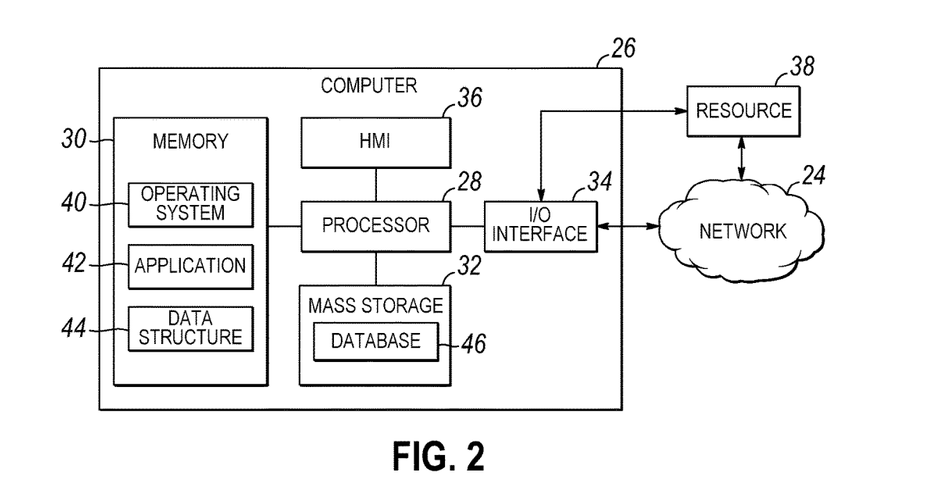
FIG. 2 is a diagrammatic view of an exemplary computing system of FIG. 1.
Figure 3:
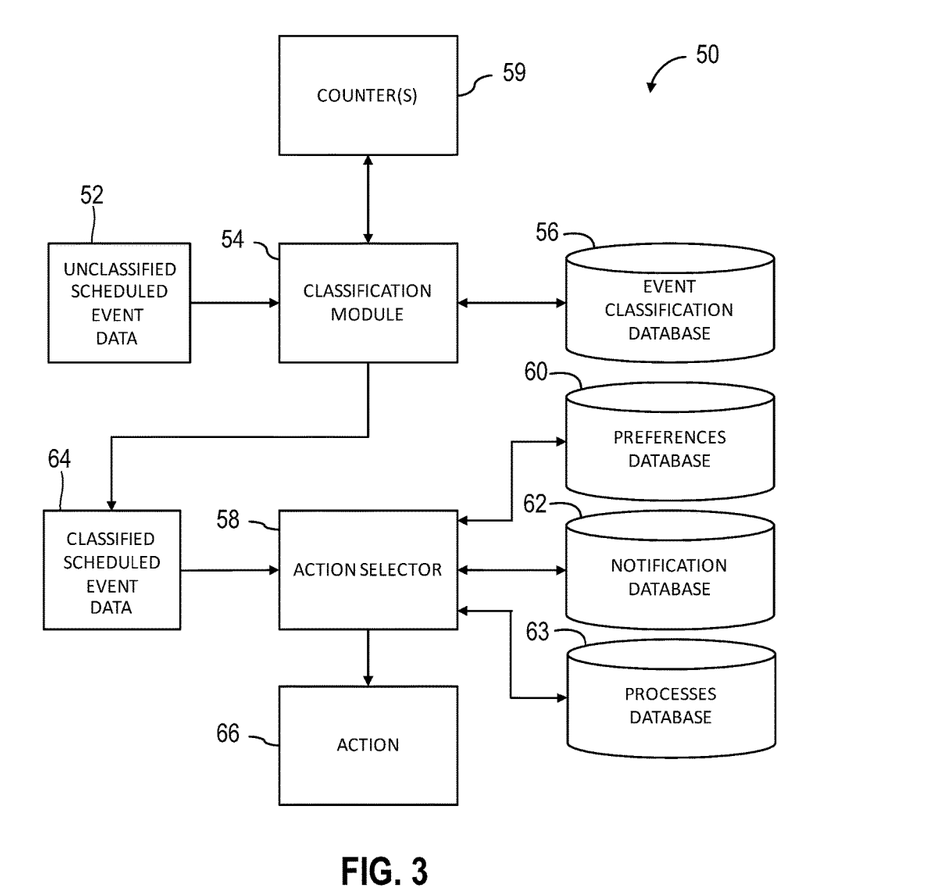
FIG. 3 is a schematic view of an event classification system including a classification module, an event classification database, an action selector, a preferences database, a notification database, and a processes database.

Classification system 18 may be in electronic communication with at least one electronic data storage device, such as mass storage memory device 32 (FIG. 2), that hosts an event classification database 56 (FIG. 3). The event classification database 56 may include a plurality of classification rules that, when applied to the data relating to a scheduled event having an undetermined classification, resolves a classification for such scheduled event. Thus, upon receiving the data relating to a scheduled event having an undetermined classification, the classification system 18 may be configured to retrieve and apply the classification rules to the data, and thereby resolve a classification for the scheduled event represented by the data. In the case of a scheduled event in the form of a travel reservation, for example, resolving a classification for the scheduled event may include classifying the travel as for leisure or for business.

Once a classification for the scheduled event has been resolved, the classification system 18 may further be configured to transform the data relating to the scheduled event by including the resolved classification in the data and removing the undetermined classification indicator from the data. This transformed data may then be sent back to the appropriate system (e.g., agency system 12, event provider system 14, event participant system 16, or service provider system 20), which may select and take an action based on the resolved classification. For example, upon receiving a resolved classification that indicates a scheduled event is for leisure, an event provider system 14 or service provider system 20 may be configured to select a leisure-type advertisement for transmission to an agency system 12 or event participant system 16, update or apply default leisure preferences for the event participant, or select a specific process tailored to leisure event participants.

Classification system 18 may be part of one or more computer systems, such as computer 26 (FIG. 2), specifically programmed to resolve classifications in response to receiving data relating to scheduled events having undetermined classifications. To this end, classification system 18 may be configured to continuously monitor for the receipt of data relating to a scheduled event having an undetermined classification. In response to receiving such data, classification system 18 may be configured to automatically query the event classification database 56 for the classification rules, apply those rules to the data relating to the scheduled event to resolve a classification, transform the data to include the resolved classification, and return the transformed data to the appropriate system. Because the classification system 18 may be configured to perform such operations automatically upon the receipt of data relating to a scheduled event having an undetermined classification, additional user interaction may not be necessary once the classification system 18 is set to monitor for the incoming data. In other words, classification system 18 may be a dedicated system for determining classifications as described herein.

Referring now to FIG. 2, the agency system 12, event provider system 14, event participant system 16, classification system 18, and service provider system 20 of operating environment 10 may each be implemented on one or more computer devices or systems, such as exemplary computer system 26. The computer system 26 may include a processor 28, a memory 30, a mass storage memory device 32, an input/output (I/O) interface 34, and a Human Machine Interface (HMI) 36. The computer system 26 may also be operatively coupled to one or more external resources 38 via the network 24 or I/O interface 34. External resources may include, but are not limited to, servers, databases, mass storage devices, peripheral devices, cloud-based network services, or any other suitable computer resource that may be used by the computer system 26.

The processor 28 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 30. Memory 30 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. The mass storage memory device 32 may include data storage devices such as a hard drive, optical drive, tape drive, non-volatile solid state device, or any other device capable of storing information.

Processor 28 may operate under the control of an operating system 40 that resides in memory 30. The operating system 40 may manage computer resources so that computer program code embodied as one or more computer software applications, such as an application 42 residing in memory 30, may have instructions executed by the processor 28. In an alternative embodiment, the processor 28 may execute the application 42 directly, in which case the operating system 40 may be omitted. One or more data structures 44 may also reside in memory 30, and may be used by the processor 28, operating system 40, or application 42 to store or manipulate data.

The I/O interface 34 may provide a machine interface that operatively couples the processor 28 to other devices and systems, such as the network 24 or external resource 38. The application 42 may thereby work cooperatively with the network 24 or external resource 38 by communicating via the I/O interface 34 to provide the various features, functions, applications, processes, or modules comprising embodiments of the invention. The application 42 may also have program code that is executed by one or more external resources 38, or otherwise rely on functions or signals provided by other system or network components external to the computer system 26. Indeed, given the nearly endless hardware and software configurations possible, persons having ordinary skill in the art will understand that embodiments of the invention may include applications that are located externally to the computer system 26, distributed among multiple computers or other external resources 38, or provided by computing resources (hardware and software) that are provided as a service over the network 24, such as a cloud computing service.

The HMI 36 may be operatively coupled to the processor 28 of computer 26 in a known manner to allow a user to interact directly with the computer 26. The HMI 36 may include video or alphanumeric displays, a touch screen, a speaker, and any other suitable audio and visual indicators capable of providing data to the user. The HMI 36 may also include input devices and controls such as an alphanumeric keyboard, a pointing device, keypads, pushbuttons, control knobs, microphones, etc., capable of accepting commands or input from the user and transmitting the entered input to the processor 28.

A database 46 may reside on the mass storage memory device 32, and may be used to collect and organize data used by the various systems and modules described herein. The database 46 may include data and supporting data structures that store and organize the data. In particular, the database 46 may be arranged with any database organization or structure including, but not limited to, a relational database, a hierarchical database, a network database, or combinations thereof. A database management system in the form of a computer software application executing as instructions on the processor 28 may be used to access the information or data stored in records of the database 46 in response to a query, where a query may be dynamically determined and executed by the operating system 40, other applications 42, or one or more modules. In an embodiment of the invention, the database 46 may comprise an event classification database 56 (FIG. 3) comprising classification rules that facilitate resolving a classification for a scheduled event.

FIG. 3 shows an event classification architecture 50 that may include a classification module 54, the event classification database 56, an action selector 58, a preferences database 60, a notification database 62, and a processes database 63. Event classification architecture 50 may be provided by the agency system 12, event provider system 14, event participant system 16, classification system 18, and/or service provider system 20 of operating environment 10, or any other suitable computer system. In one embodiment, the classification system 18 may provide at least the classification module 54. Classification system 18 may also provide the event classification database 56. Alternatively, event classification database 56 may be hosted on at least one electronic data storage device located remotely from and accessible by the classification system 18.

In operation, classification module 54 may receive unclassified scheduled event data 52 that relates to one or more reserved event offerings. The unclassified scheduled event data 52 may include an undetermined classification indicator, which informs classification module 54 that the data's classification status is undetermined (e.g., that a purpose or type has not been classified for the scheduled event).

Classification module 54 may be in data communication with the event classification database 56. Upon the unclassified scheduled event data 52 being received, classification module 54 may be configured to automatically query the event classification database 56 for a plurality of classification rules stored therein. Each of the classification rules may include a characteristic and may be associated with a respective one of a plurality of designated classifications. For example, some of the rules may be associated with a leisure classification, and other rules may be associated with a business classification. The classification module 54 may further be configured to automatically compare the characteristic of each classification rule with the scheduled event represented by the unclassified scheduled event data 52, and thereafter automatically resolve a classification for the scheduled event based on whether the scheduled event satisfies the characteristic of one or more of the classification rules.

The classification module 54 may further be in communication with a plurality of counters 59, which may be maintained by the classification system 18. Each of the counters 59 may be uniquely associated with one of the designated classifications associated with the classification rules. In other words, it may be the case that no two counters 59 are associated with the same designated classification. For example, only one counter may be associated with a leisure classification, and only one counter may be associated with a business classification.

In one embodiment, the classification module 54 may apply the classification rules to the unclassified scheduled event data 52 to resolve a classification for the scheduled event in the following way. For each of the classification rules, if the scheduled event represented by the unclassified scheduled event data 52 satisfies the characteristic of the classification rule, the classification module 54 may be configured to increment the counter 59 associated with the same designated classification as the satisfied classification rule. Once all of the classification rules have been compared with the unclassified scheduled event data 52, the classification module 54 may be configured to resolve the classification for the scheduled event based on the counter 59 having the highest value. For example, in one embodiment, the classification module 54 may be configured to resolve the classification for the scheduled event as the designated classification associated with the counter 59 having the highest value.

Once a classification has been resolved for the unclassified scheduled event, the classification module 54 may be configured to automatically transform the unclassified scheduled event data 52 into classified or formatted scheduled event data 64. In some embodiments, this transformation may occur by virtue of the classification module 54 being configured to insert the resolved classification into the unclassified scheduled event data 52. Additionally, the classification module 54 may be configured to transform the unclassified scheduled event data 52 by removing the undetermined classification indicator, if present. In alternative embodiments, classification module 54 may be configured to transform the unclassified scheduled event data 52 by changing a parameter in the data from being associated with an undetermined classification to being associated with the resolved classification. Regardless, once the classified or formatted scheduled event data 64 has been generated, the classification module 54 may be configured to automatically return the classified or formatted scheduled event data 64 to enable the resolved classification to be retrieved from the data 64 and a selection of an action relating to the scheduled event based on the retrieved classification. In this way, the event classification architecture 50 offers improved functionality over conventional systems, which include no mechanism to resolve or infer a classification of a scheduled event via an automatic process, much less utilizing such resolved classification as a basis for selecting an action relating to the scheduled event. Because event classification architecture 50 may be implemented on one or more dedicated computer systems, such as one or more of the systems of operating environment 10, the event classification architecture 50 may be configured such that little or no manual input may be necessary to perform the functions of event classification architecture 50.

In one embodiment, the classified or formatted scheduled event data 64 may be transmitted to action selector 58. The action selector 58 may be configured to retrieve the resolved classification from the classified or formatted scheduled event data 64 and select an action 66 that relates to the scheduled event based on the retrieved classification. Action selector 58 may be hosted on a computerized system different from the computer system hosting the classification module 54. Action selector 58 may further be configured to perform at least one operation based on the retrieved classification to select the action 66 relating to the scheduled event.

In one embodiment, action selector 58 may be in communication with the preferences database 60. Preferences database 60 may include default preferences for one or more event participants, organized by each of the designated classifications. In other words, preferences database 60 may include default preferences for each designated classification, and possibly for each event participant. For example, if a passenger accesses a reservation system of an airline to reserve or inquire about booking a flight, and such reservation or inquiry is classified as being for business, default preferences contained in preferences database 60 may instruct the reservation system to search or request seats in business class only. Conversely, if the passenger reserves or inquires about a flight that is classified as being for leisure, the default parameters for that passenger in preferences database 60 may instruct the reservation system to search or request economy class only.

Upon retrieving the resolved classification from the classified or formatted scheduled event data 64, the action selector 58 may be configured to either update preferences corresponding to the retrieved classification in the preferences database 60 based on the attributes of the scheduled event, or set preferences corresponding to the retrieved classification in the preferences database 60 for the scheduled event. For example, if the classified or formatted scheduled event data 64 indicates a passenger is scheduled to take a trip classified as leisure, action selector 58 may be configured to build or compile a list of preferences used to book the scheduled trip and thereafter generate an action 66 that includes updating the leisure preferences of the passenger in the preferences database 60 based on the built or compiled list. In this way, next time the passenger reserves or attempts to reserve a trip that the classification module 54 classifies as leisure, the action selector 58 may be configured to retrieve the passenger's up to date preferences for leisure trips from preferences database 60 and generate an action 66 that results in those preferences being set for the trip.

In another embodiment, action selector 58 may be in data communication with notification database 62. Action selector 58 may further be configured to generate an action 66 that includes generating a notification or recommendation for transmission to a travel agent or passenger based on the resolved classification retrieved from the classified or formatted scheduled event data 64. More particularly, upon retrieving the resolved classification, action selector 58 may be configured to query the notification database 62 for a notification or recommendation associated with the resolved classification and scheduled event. For example, if a scheduled flight reservation to Boston is classified as being for business, action selector 58 may receive a recommendation in the form of a Boston luxury car service advertisement from the notification database 62. Action selector 58 may then generate an action 66 that includes sending the advertisement to a travel agent or passenger.

In another embodiment, action selector 58 may also be in data communication with processes database 63. Processes database 63 may store preferred processes that relate to the scheduled events and are organized by the designated classifications. For example, if a scheduled event is classified as being for business, processes database 63 may indicate that a prioritized or faster process may be implemented for the scheduled event. Such prioritized process may include a faster security screening, faster checkout, discounts, upgraded seating, and other benefits. Upon retrieving the resolved classification, action selector 58 may be configured to query the processes database 63 and generate an action 66 that includes applying a preferred process corresponding to the resolved classification and scheduled event.

Figure 4:
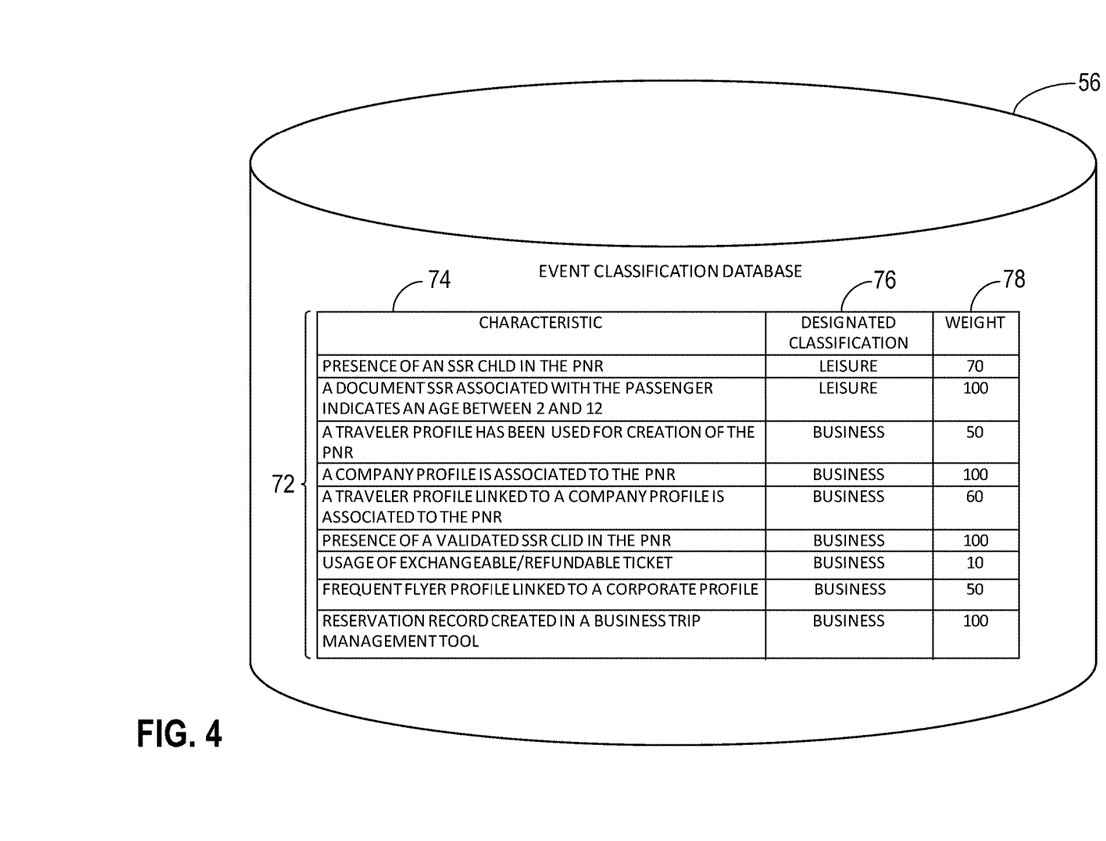
FIG. 4 is a schematic view of an exemplary event classification database.

FIG. 4 provides an exemplary arrangement of data for the event classification database 56 of event classification architecture 50. As previously described, event classification database 56 may include a plurality of classification rules 72. Each classification rule 72 may include a characteristic 74 and be associated with a designated classification 76. When resolving a classification for a scheduled event defined by unclassified scheduled event data 52, classification module 54 of event classification architecture 50 may be configured to compare the characteristic 74 of each classification rule 72 to the scheduled event. When the comparison indicates that the scheduled event satisfies a characteristic 74 of a classification rule 72, then classification module 54 may be configured to increment a counter 59 associated with the designated classification 76 of the satisfied classification rule 72. For example, according to the classification rules 72 illustrated in FIG. 4, if a scheduled event includes a PNR with a special service request ("SSR") that indicates a child is traveling, classification module 54 may increment a counter associated with a leisure classification. Conversely, if the scheduled event includes a PNR associated with a traveler profile that is linked to a company profile, then classification module 54 may be configured to increment a counter associated with a business classification. After comparing all the characteristics 74 of the classification rules 72 to the scheduled event, classification module 54 may be configured to resolve a classification for the scheduled event based on the counter having the highest value.

In some embodiments, classification module 54 may resolve the classification for the scheduled event as the designated classification associated the counter having the highest value. In other embodiments, classification module 54 may determine if the counter having the highest value is greater than the counter with the next highest value by a confidence threshold value. If the counter having the highest value does not exceed the next highest counter by at least the confidence threshold value, then classification module 54 may resolve the classification for the scheduled event as an indeterminate classification. In this case, action selector 58 may not generate an action 66 based on the scheduled event's classification. For example, one embodiment may include two counters, one associated with a leisure classification and the other associated with a business classification, and a confidence threshold value of five. If the leisure counter is the highest value counter with a value of ten (10), which signifies that the scheduled event satisfied ten classification rules 72 associated with the leisure classification, and the business counter is the next highest counter with a value of six, which similarly signifies the scheduled event satisfied six classification rules 72 associated with the business classification, then the classification module 54 may resolve an indeterminate classification for the scheduled event because the highest counter (leisure counter) fails to exceed the next highest counter (business counter) by at least five (the confidence threshold value). But alternatively, if the leisure counter includes a value of eleven (11) in the above scenario, then the leisure counter exceeds the business counter by at least the confidence threshold value, and classification module 54 may resolve a leisure classification for the scheduled event.

In some embodiments, each classification rule 72 may also be associated with a weight value 78. The weight value 78 of each classification rule 72 may serve to define the strength of an association between the characteristic 74 and the designated classification 76 of a classification rule 72. For example, FIG. 4 illustrates a weight value of 60 to describe the association strength between the business classification and a scheduled event including a PNR associated with traveler profile linked to a company profile. Conversely, a weight value of 100 describes the association strength between a scheduled event including a PNR associated with a company profile. Hence, according to the example illustrated in FIG. 4, a scheduled event having a PNR associated with a company profile is more likely to be for a business purpose than a PNR associated with a traveler profile linked to a company profile.

When each classification rule 72 of event classification database 56 is associated with a weight 78, for each classification rule 72 having a characteristic 74 satisfied by the scheduled event, classification module 54 may increase a counter 59 by the weight 78 associated with the classification rule 72 (as opposed to incrementing such counter). In this way, classification module 54 takes into account the strength of the association between the characteristic 74 and designated classification 76 of each satisfied classification rule 72 when resolving a classification for the scheduled event.

Figure 5:
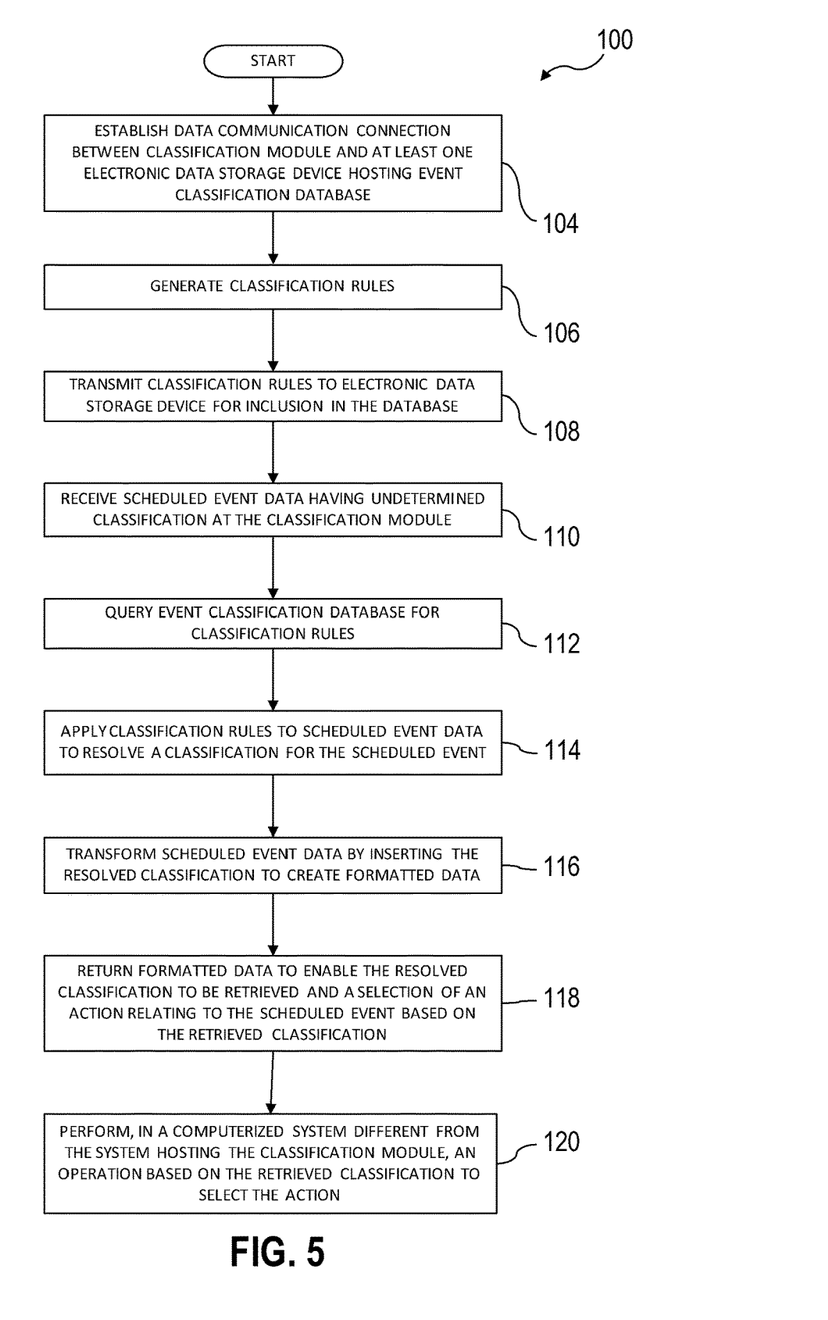
FIG. 5 is a flowchart of an event classification process that may, at least in part, be performed by the event classification system.

FIG. 5 provides a flowchart for a process 100 of which all or part may be executed by the event classification architecture 50. In block 104, process 100 may establish a connection for data communication between classification module 54, which may be hosted on classification system 18, and at least one electronic data storage device. The at least one electronic data storage device may host the event classification database 56. In some embodiments, the at least one electronic data storage device and event classification database 56 may be local to the host of classification module 54. Alternatively, the at least one electronic storage device and event classification database 56 may be remote from the host of the classification module 54, in which case the classification module 54 may access the at least one electronic data storage device and event classification database 56 via a network such as the Internet.

In block 106, the process 100 may generate classification rules for the event classification database 56. As previously described, each of the classification rules may include a characteristic and may be associated with a designated classification and a weight. In block 108, the process 100 may transmit the classification rules to the electronic data storage device for inclusion in the event classification database 56. In some embodiments, the classification module 54 may serve to generate the classification rules and transmit such rules to the electronic data storage device.

In block 110, the process 100 may receive data relating to a scheduled event having an undetermined classification. In other words, the received data may represent a scheduled event that is not classified for a particular purpose or as a particular type. Such data may be received at the classification module 54. As previously described, the scheduled event may include or be defined by one or more reservations to participate in an event offered by an event provider. For example, a scheduled event may include a flight reservation, hotel reservation, car rental reservation, purchased tickets for concerts and sporting events, and the like.

In response to receiving the data relating to the scheduled event, process 100 may automatically proceed to block 112 and query the event classification database 56 for the classification rules. Because the process 100 automatically query's the event classification database 56 in response to receiving the data, and may further proceed to automatically perform one or more of the subsequent operations of the process, any computer system, such as those disclosed in FIG. 1, implementing all or part of process 100 may be considered a specialized computer system specifically programmed or dedicated to perform the steps of process 100. In other words, besides turning on one or more computer systems that implement process 100 and setting at least one of such computer systems to begin monitoring for incoming data relating a scheduled event having an undetermined classification, no further manual input for such computer systems to perform the operations in blocks 110 and on of the process 100 may be necessary. Rather, process 100 may be configured to instruct the computer system or systems to perform such operations automatically.

In block 114, the process 100 may apply the retrieved classification rules to the data relating to the scheduled event. In this way, process 100 is able to resolve the classification for the scheduled event, such as by determining that the scheduled event is for business or for leisure. In block 116, the process 100 may transform the data relating to the scheduled event by inserting the resolved classification into such data. In some embodiments, when the data also includes an undetermined classification indicator, the process 100 may transform the data relating to the scheduled event by removing such indicator. In further embodiments, the data relating the scheduled event having an undetermined classification may include a parameter that, depending on the parameter's value, indicates whether the scheduled event includes an undetermined classification or some other classification, such as leisure or business. In this case, the process 100 may transform the data relating to the scheduled event by modifying such parameter to indicate the resolved classification rather than an undetermined classification. Regardless, once modified, the received data relating to the scheduled event may be referred to as classified or formatted data.

In block 118, the process 100 may proceed to return the formatted data, such as from the classification module 54, and thereby enable retrieval of the resolved classification from the formatted data and a selection of an action related to the scheduled event based on the retrieved resolved classification. In block 120, the process 100 performs at least one operation based on the retrieved resolved classification. A computerized system different from the system hosting the classification module 54 may perform the at least one operation. For example, any of the agency systems 12, event provider systems 14, service provider systems 20, and event participant systems 16 may receive such formatted data from the classification system 18, retrieve the resolved classification from the formatted data, and thereafter select an action 66 based on the retrieved classification using an action selector 58. The at least one operation may include querying a database in communication with the action selector 58, such as the preferences database 60, notification database 62, or processes database 63, based on the resolved classification to select an action 66. In one embodiment, the selected action 66 may include generating a recommendation, advertisement, or notification related to the scheduled event based on the retrieved resolved classification. In addition or alternatively, such selected action 66 may include setting a plurality of preferences for the scheduled event, updating a plurality of preferences stored for an event participant, or applying a preferred process based on the resolved classification. In this way, knowledge of the classification of scheduled events, obtained via an essentially automated process, and the event classification database 56 specifically improve operation of systems such as the agency systems 12, event provider systems 14, and service provider systems 20 by enabling each to provide a customized or tailored experience based on the resolved classification, and without necessitating the manual entry of such classification.

Figure 6:
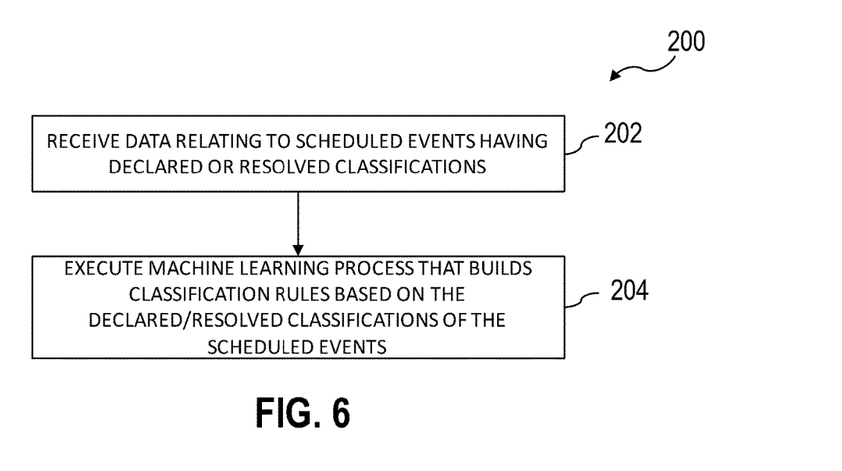
FIG. 6 is a flowchart of an exemplary process for generating a plurality of classification rules.

FIG. 6 provides a flowchart of a first exemplary process 200 for generating the plurality of classification rules, as performed by process 100 in block 106. In block 202, process 200 may receive data relating to a plurality of scheduled events having declared or resolved classifications. For example, in one or more of the scheduled events represented by the received data, an event participant may have declared a classification when making or managing a reservation for the scheduled event. Additionally or alternatively, event classification architecture 50 may have previously resolved the classifications for one or more of such scheduled events. In any event, process 200 may automatically receive the data relating to each of the scheduled events as such reservations of the scheduled event are made or as such scheduled events receive classifications.

In block 204, process 200 may execute a machine learning process that builds or compiles classification rules based upon the declared or resolved classifications of the scheduled events represented by the received data. In one embodiment, the machine learning process may include a statistical analysis that counts the number of times a characteristic of a scheduled event is associated with a certain classification. The higher the count, the stronger the association between that characteristic and the classification will be. This count data may be used to generate the classification rules.

In one embodiment, the count for any given characteristic-classification association may need to exceed a threshold value before being made into a classification rule. In other embodiments, once the threshold value has been exceeded, the count for a given characteristic-classification association may further form the basis for the weight associated with the classification rule. For example, if the count for a given characteristic-classification association is between a first predefined range, then the machine learning process may set the weight associated with the corresponding classification rule as a first predetermined value, if the count for a given characteristic-classification association is in a second predefined range, then the machine learning process may set a weight associated with the corresponding classification rule as a second value, and so on. Besides the count data, the machine learning algorithm may identify and use any other statistical data from the received data relating to the classified scheduled events that would be recognized as useful by those skilled in the art.

Figure 7:
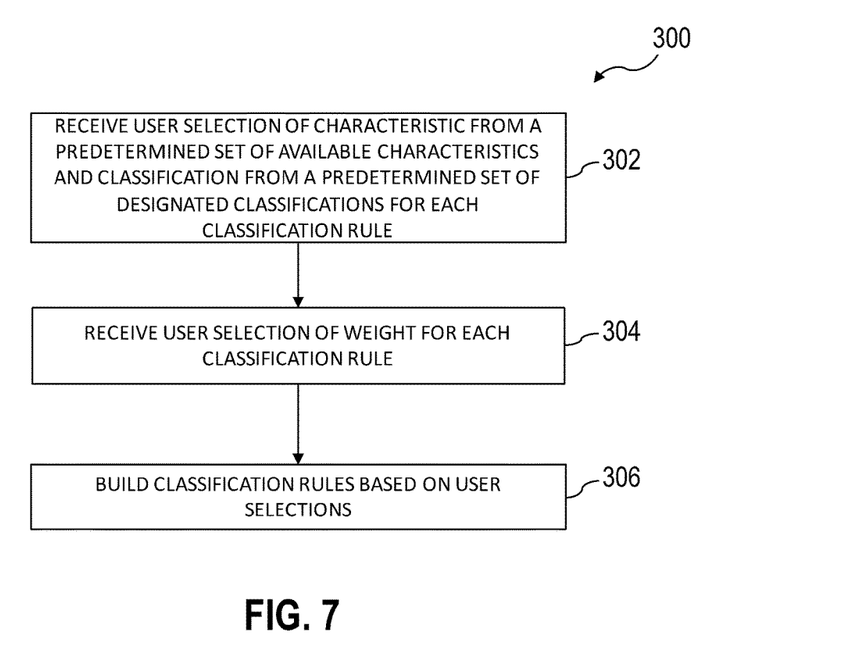
FIG. 7 is a flowchart of another exemplary process for generating a plurality of classification rules.

FIG. 7 provides a flowchart of another exemplary process 300 for generating the plurality of classification rules, as performed by process 100 in block 106. In block 302, process 300 may receive user selections of characteristics from a predetermined set of available characteristics and classifications from a predetermined set of designated classifications for each classification rule. A system administrator may be responsible for defining the available characteristics and designated classifications of each set. Alternatively or additionally, the user making the selections may be able to create customized characteristics and classifications for each of the classification rules. In block 304, process 300 may similarly receive user selections of weights for each classification rule. As previously described, the weight associated with a classification rule may define the strength of an association between a characteristic of a classification rule and the classification associated with that rule. In block 306, the process 300 may build or compile the plurality of classification rules based upon the received user selections.

Figure 8:
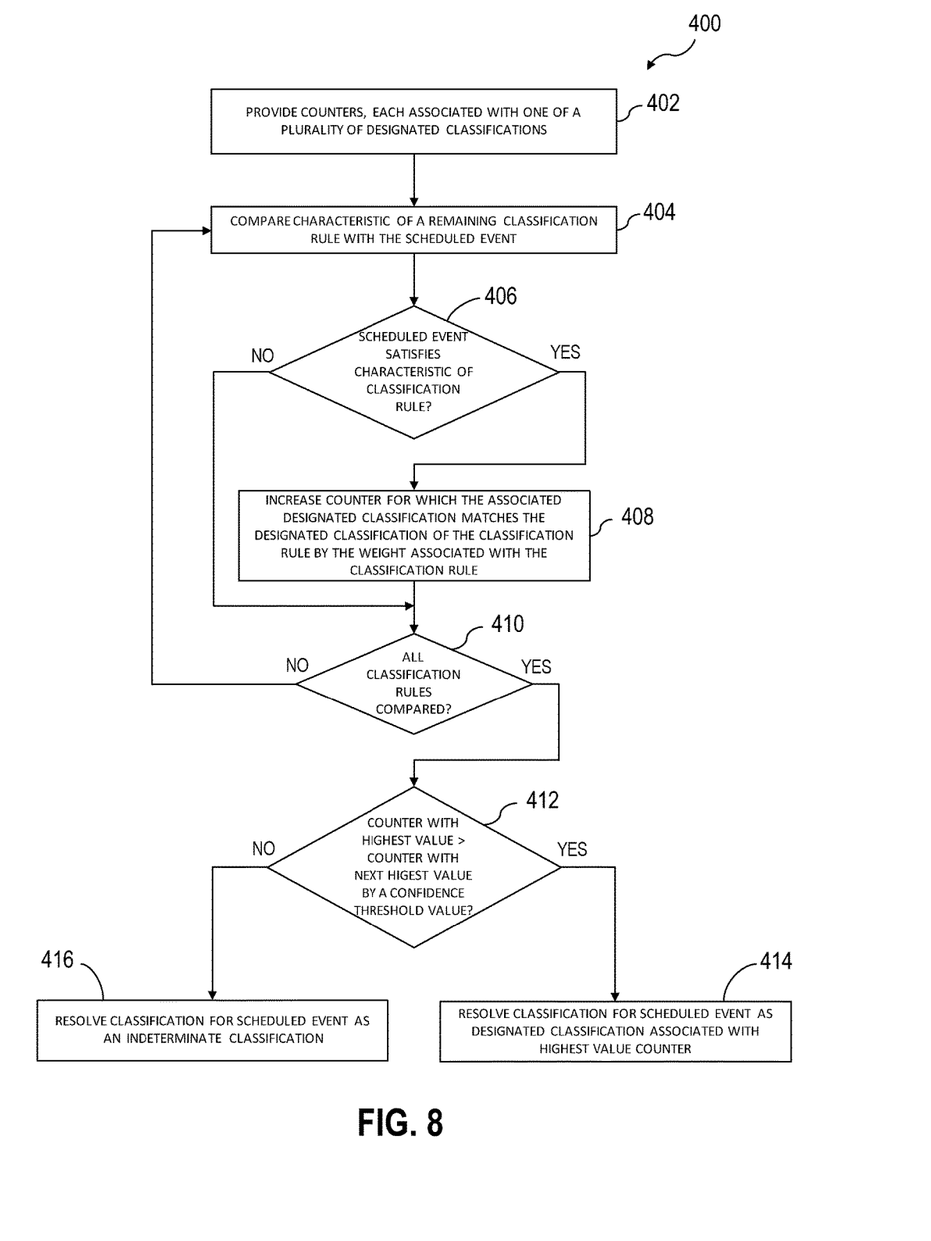
FIG. 8 is a flowchart of an exemplary process for applying the classification rules to scheduled event data to resolve a classification for the scheduled event.

FIG. 8 provides a flowchart of an exemplary process 400 for applying the classification rules to the data relating to a scheduled event having an undetermined classification to resolve a classification for the scheduled event, as performed by process 100 in block 114. In block 402, process 400 may provide a plurality of counters. Each of the counters may be uniquely associated with one of the classifications associated with the classification rules. In this way, it may be the case that no two counters are associated with the same classification. In block 404, process 400 may compare the characteristic of each classification rule with the scheduled event.

In block 406, process 400 may determine whether the scheduled event satisfies a characteristic of one of the classification rules. A scheduled event may satisfy a characteristic of a classification rule when the scheduled event includes the elements of the characteristic, such as an SSR indicating that a child is traveling under a flight reservation. If the scheduled event satisfies the characteristic of the classification rule, then process 400 may proceed to block 408 and increment one of the counters. More particularly, process 400 may increment the counter associated with the classification that matches the classification associated with the classification rule of the satisfied characteristic. In some embodiments, rather than incrementing the matching counter, process 400 may increase such counter by a weight associated with classification rule of the satisfied characteristic. Either way, process 400 may thereafter advance to block 410. Conversely, if the scheduled event does not satisfy the characteristic of the classification rule at block 406, then process 400 may proceed directly to block 410 and skip block 408.

In block 410, process 400 may determine whether all classification rules have been compared with the scheduled event. If not, then process 400 may return to block 404 to compare a characteristic of any remaining classification rule with the scheduled event. Alternatively, if process 400 determines that all classification rules have been compared, process 400 may proceed to block 412. In block 412, process 400 may determine whether the counter with the highest value exceeds the counter with the next highest value by a confidence threshold value. If yes, process 400 may proceed to block 414 and resolve the classification for the scheduled event as the classification associated with the highest valued counter. However, if the counter with the highest value does not exceed the counter with the next highest value by the confidence threshold value, process 400 may instead advance to block 416 and resolve the classification for the scheduled event as an indeterminate classification. In alternative embodiments, upon determining that all classification rules have been compared at block 410, process 400 may resolve the classification as the classification associated with the highest valued counter, without reference to the counter with the next highest value or the confidence threshold value.

Figure 9:
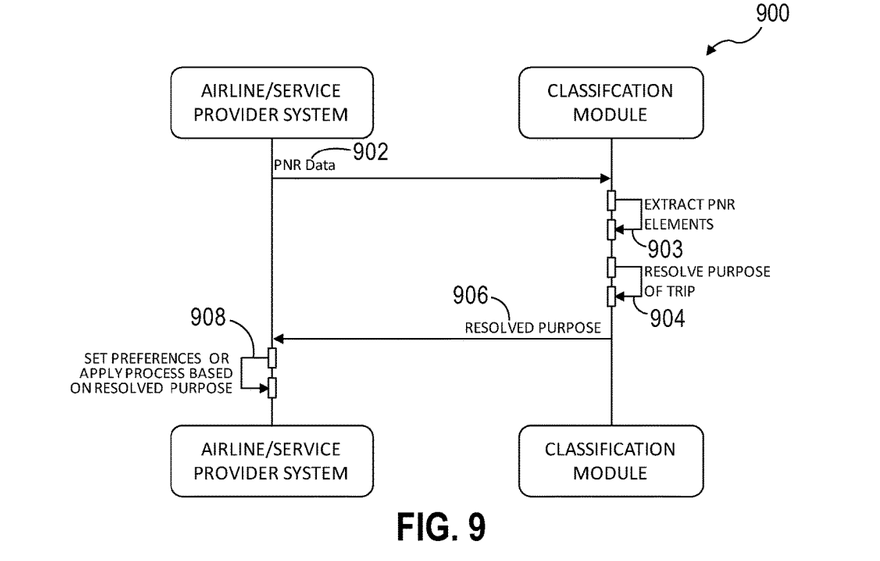
FIG. 9 is a diagram of an exemplary sequence of steps for resolving a classification for a scheduled event and taking an action based on the resolved classification.

FIG. 9 provides an exemplary sequence diagram 900 for resolving a purpose for a scheduled event including a PNR, and thereafter selecting the action of setting passenger preferences or selecting a certain process based on the resolved classification. Such PNR may include multiple reservations, such as a flight reservation, hotel reservation, rental car reservation, and the like. Event classification architecture 50 may execute all or some of the functions, acts, and/or operations in the sequence diagram 900.

An airline, travel agent, or other service provider (e.g., a GDS) may use one or more of the systems illustrated in FIG. 1 to transmit data representing the unclassified PNR in a message 902 to the classification module 54. In a self-message 903, upon receiving the data, the classification module 54 may extract PNR elements from data, which may represent attributes or characteristics of the scheduled event. In a self-message 904, the classification module 54 may resolve a purpose for the trip using embodiments discussed herein. In a return message 906, classification module 54 may transmit formatted data relating to the PNR and including the resolved purpose to the system responsible for transmitting the original data. In a self-message 908, the receiving system may retrieve the resolved purpose from the formatted data and set preferences or select a process for the PNR based on the retrieved purpose. In one exemplary embodiment, the receiving system, via an action selector 58, may query a preferences database 60 for the preferences corresponding to the resolved purpose of a particular passenger in the PNR. For example, the particular passenger may prefer economy class for leisure trips, and business class for business-related trips. Similarly, the receiving system, via action selector 58, may query a processes database 63 for a preferred process corresponding to the resolved purpose. For example, when the trip is resolved as being for business, action selector 58 may retrieve a preferred process that implements higher fares or grants prioritized treatment. After receiving the preferences or processes corresponding to the resolved purpose, action selector 58 may select an action 66 that comprises applying those preferences or processes to the PNR.

Figure 10:
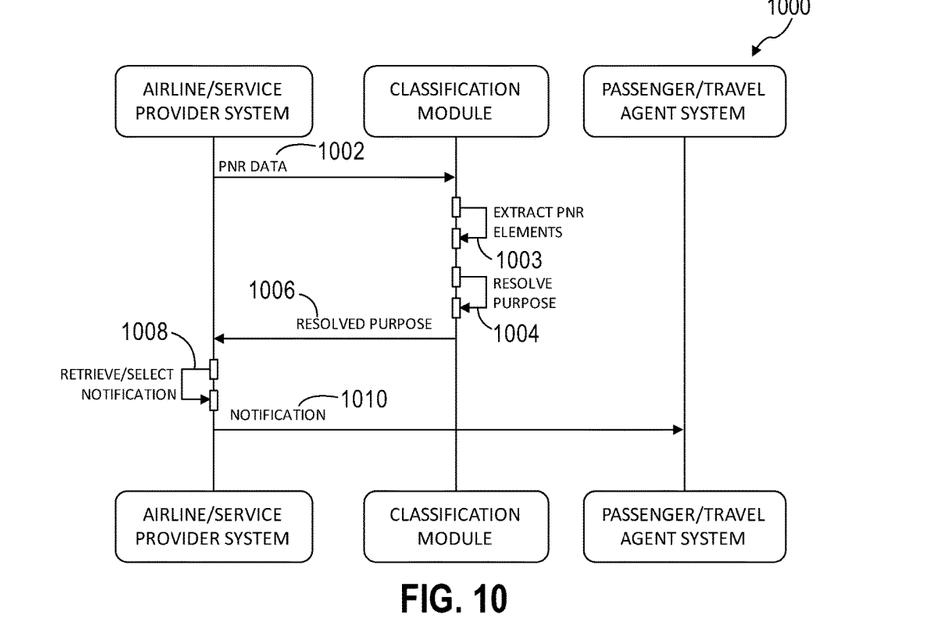
FIG. 10 is a diagram of an exemplary sequence of steps for resolving a classification for a scheduled event and selecting an action to transmit a notification based on the resolved classification.

FIG. 10 provides an exemplary sequence diagram 1000 for resolving a purpose for a scheduled event including a PNR, and thereafter selecting an action of sending a notification to a passenger or travel agent based on the resolved classification. Messages 1002, 1003, 1004, and 1006 may be substantially identical to messages 902, 903, 904, and 906 of FIG. 9. In a self-message 1008, the system receiving the formatted data may retrieve the resolved purpose from the formatted data, and thereafter retrieve and select a notification based on the resolved purpose. In one exemplary embodiment, the receiving system may host the action selector 58, which may be in data communication with the notification database 62 of event classification architecture 50. Upon receiving the formatted data, the action selector 58 may retrieve the resolved purpose and query the notification database 62 based thereon. Action selector 58 may then retrieve a notification, such as an update relating to the trip or an advertisement, based on the resolved purpose. For example, if the resolved purpose is leisure, then the retrieved notification may include an advertisement for an amusement park at a destination of a trip represented by the PNR. Conversely, if the resolved purpose is business, then the retrieved notification may include an advertisement for an exclusive lounge in an airport of a trip represented by the PNR. After retrieving a notification from the notification database 62, the action selector 58 may select an action 66 that includes transmitting the retrieved notification in a message 1010 to a trip passenger's computing device or a travel agent's computing system.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

Various program code described herein may be identified based upon the application within that it is implemented in specific embodiments of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flowcharts, sequence diagrams, and/or block diagrams.

In certain alternative embodiments, the functions, acts, and/or operations specified in the flowcharts, sequence diagrams, and/or block diagrams may be re-ordered, processed serially, and/or processed concurrently consistent with embodiments of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A system for implementing an event classification database, the system comprising:
    at least one electronic data storage device that hosts the event classification database; and
    a classification system in data communication with the at least one electronic data storage device, the classification system including at least one processor and a memory, wherein the memory stores instructions configured, upon execution by the at least one processor, to cause the classification system to:
    automatically receive data relating to a plurality of scheduled events having declared classifications;
    execute a machine learning process that builds a plurality of classification rules based on the declared classifications of the scheduled events having the declared classifications;
    transmit the classification rules to the at least one electronic data storage device for inclusion in the event classification database;
    receive data relating to a scheduled event having an undetermined classification; and
    in response to receiving the data relating to the scheduled event having the undetermined classification, automatically:
        query the event classification database to retrieve the classification rules,
        compare a characteristic of each classification rule with the scheduled event having the undetermined classification,
        resolve a classification for the scheduled event having the undetermined classification based on whether the scheduled event having the undetermined classification satisfies the characteristic of one or more of the classification rules,
        transform the data relating to the scheduled event having the undetermined classification by inserting the resolved classification to create formatted data, and
        return, from the classification system and to a computerized system different from the classification system, the formatted data to enable the resolved classification to be retrieved from the formatted data and a selection of an action relating to the scheduled event having the undetermined classification based on the resolved classification at the different computerized system.

2. The system of claim 1, wherein the instructions are further configured upon execution to cause the classification system to:
    receive a user-selected characteristic from a predetermined list of available characteristics and a user-selected classification from a predetermined list of designated classifications for each of the classification rules; and
    build the classification rules based on the user-selected characteristic and the user-selected classification for each classification rule.

3. The system of claim 1, wherein the classification for the scheduled event having the undetermined classification is selected from among a plurality of designated classifications, each classification rule is associated in the event classification database with a weight and a respective one of the designated classifications, the classification system includes a plurality of counters, each of the counters being associated with one of the designated classifications, and
  wherein the instructions being configured upon execution to automatically cause the classification system to apply the classification rules to the data relating to the scheduled event having the undetermined classification to resolve the classification for the scheduled event having the undetermined classification further comprise instructions configured upon execution to automatically cause the classification system to:
  if the scheduled event having the undetermined classification satisfies a characteristic of one of the classification rules, increase one of the counters for which the associated designated classification matches the designated classification of the classification rule by the weight associated with the classification rule; and
  resolve the classification for the scheduled event having the undetermined classification based on the counter with the highest value.

4. The system of claim 3, wherein the instructions being configured upon execution to automatically cause the classification system to resolve the classification for the scheduled event having the undetermined classification based on the counter with the highest value comprises instructions configured upon execution to automatically cause the classification system to:
  if the counter with the highest value is greater than the counter with the next highest value by a confidence threshold value, resolve the classification for the scheduled event having the undetermined classification as the designated classification associated with the counter with the highest value.

5. A method for implementing an event classification database, the method comprising:
  automatically receiving data relating to a plurality of scheduled events having declared classifications;
  executing a machine learning process that builds a plurality of classification rules based on the declared classifications of the scheduled events having the declared classifications;
  transmitting the classification rules to at least one electronic data storage device for inclusion in the event classification database;
  establishing a connection for data communication between a classification system and the at least one electronic data storage device that hosts the event classification database;
  receiving data relating to a scheduled event having an undetermined classification at the classification system; and
  in response to receiving the data relating to the scheduled event having the undetermined classification, automatically causing at least one processor of the classification system to:
    query the event classification database to retrieve the classification rules,
    compare a characteristic of each classification rule with the scheduled event having the undetermined classification,
    resolve a classification for the scheduled event having the undetermined classification based on whether the scheduled event having the undetermined classification satisfies the characteristic of one or more of the classification rules,
    transform the data relating to the scheduled event having the undetermined classification by inserting the resolved classification to create formatted data, and
    return the formatted data to enable the resolved classification to be retrieved from the formatted data and a selection of an action relating to the scheduled event having the undetermined classification based on the resolved classification.

6. The method of claim 5, wherein each of the classification rules includes a user-selected characteristic that is selected from a predetermined list of available characteristics and a user-selected weight, and the classification rules are transmitted to the at least one electronic data storage device before the data relating to the scheduled event having the undetermined classification is received.

7. The method of claim 5, wherein the classification for the scheduled event having the undetermined classification is selected from among a plurality of designated classifications, each classification rule is associated in the event classification database with a weight and a respective one of the designated classifications, and automatically causing the at least one processor of the classification system to apply the classification rules to the scheduled event having the undetermined classification to resolve the classification for the scheduled event having the undetermined classification further comprises automatically causing the at least one processor to:
  provide a plurality of counters, each of the counters being associated with one of the designated classifications;
  if the scheduled event having the undetermined classification satisfies the characteristic of one of the classification rules, increase one of the counters for which the associated designated classification matches the designated classification of the classification rule by the weight associated with the classification rule; and
  resolve the classification for the scheduled event having the undetermined classification based on the counter with the highest value.

8. The method of claim 7, wherein automatically causing the at least one processor to resolve the classification for the scheduled event having the undetermined classification based on the counter with the highest value comprises automatically causing the at least one processor to:
  if the counter with the highest value is greater than the counter with the next highest value by a confidence threshold value, resolve the classification for the scheduled event having the undetermined classification as the designated classification associated with the counter with the highest value.

9. The method of claim 8, wherein automatically causing the at least one processor to resolve the classification for the scheduled event having the undetermined classification based on the counter with the highest value further comprises automatically causing the at least one processor to:
  if the counter with the highest value is not greater than the counter with the next highest value by the confidence threshold value, resolve the classification for the scheduled event having the undetermined classification as an indeterminate classification.

10. The method of claim 5, wherein the action includes generating a recommendation related to the scheduled event having the undetermined classification based on the resolved classification.

11. The method of claim 5, wherein the action includes setting a plurality of preferences for the scheduled event having the undetermined classification based on the resolved classification.

12. The method of claim 5, further comprising:
performing, in a computerized system different from the classification system, at least one operation based upon the resolved classification to select the action relating to the scheduled event having the undetermined classification.

13. A computer program product for implementing an event classification database, the computer program product comprising:
a non-transitory computer readable storage medium; and
instructions stored on the non-transitory computer readable storage medium that, when executed by at least one processor of a classification system in communication with at least one electronic data storage device that hosts the event classification database, causes the classification system to:
automatically receive data relating to a plurality of scheduled events having declared classifications;
execute a machine learning process that builds a plurality of classification rules based on the declared classifications of the scheduled events having the declared classifications;
transmit the classification rules to the at least one electronic data storage device for inclusion in the event classification database;
receive data relating to a scheduled event having an undetermined classification; and
in response to receiving the data relating to the scheduled event having the undetermined classification, automatically:
query the event classification database to retrieve the classification rules,
compare a characteristic of each classification rule with the scheduled event having the undetermined classification,
resolve a classification for the scheduled event having the undetermined classification based on whether the scheduled event having the undetermined classification satisfies the characteristic of one or more of the classification rules,
transform the data relating to the scheduled event having the undetermined classification by inserting the resolved classification to create formatted data, and
return, from the classification system and to a computerized system different from the classification system, the formatted data to enable the resolved classification to be retrieved from the formatted data and a selection of an action relating to the scheduled event having the undetermined classification based on the resolved classification at the different computerized system.

* * * * *